United States Patent [19]

Saegusa et al.

[11] Patent Number: 5,239,572
[45] Date of Patent: Aug. 24, 1993

[54] CORDLESS KEY TELEPHONE SYSTEM CAPABLE OF QUICKLY ANSWERING INCOMING CALLS

[75] Inventors: Noboru Saegusa; Akio Yotsutani; Shinji Kumataka; Kouzo Kobayashi; Hiroyuki Misawa; Kosuke Hashimoto, all of Tokyo, Japan

[73] Assignees: NEC Corporation; Nippon Telegraph and Telephone Corporation, both of Tokyo, Japan

[21] Appl. No.: 686,468

[22] Filed: Apr. 17, 1991

[30] Foreign Application Priority Data

Apr. 17, 1990 [JP] Japan .................................... 2-99416
Jul. 25, 1990 [JP] Japan .................................... 2-197200

[51] Int. Cl.$^5$ ............................................. H04M 11/00
[52] U.S. Cl. ........................................ 379/61; 379/58; 379/63; 379/156
[58] Field of Search ................. 379/58, 60, 61, 59, 379/62, 63; 455/33.1, 33.2, 56.1

[56] References Cited

U.S. PATENT DOCUMENTS

| | | | |
|---|---|---|---|
| 4,852,148 | 7/1989 | Shibata et al. | 379/61 |
| 4,939,785 | 7/1990 | Murata et al. | 379/63 |
| 5,005,014 | 4/1991 | Jasinski | 379/59 |
| 5,014,295 | 5/1991 | Kunihiro | 379/61 |

Primary Examiner—Curtis Kuntz
Assistant Examiner—George J. Oehling
Attorney, Agent, or Firm—Sughrue, Mion, Zinn, Macpeak & Seas

[57] ABSTRACT

In a cordless key telephone system, access units are located in groups corresponding to service areas for broadcasting radio signals on a control channel or on an assigned speech channel to cordless stations. A main controller selects one of the access units for each service area in response to an incoming call from the switched telephone network and sends a first alert signal to the selected access units to cause them to broadcast a recurrent sequence of second alert signals containing the identifiers of standby cordless stations. The second alert signal is received by each standby cordless station and an ACK signal is transmitted if the received signal contains its identifier. The ACK signal is copied by each access unit for transmission to the main controller, whereupon it returns a proceed-to-assign signal if the number of the received copies of the ACK signals is equal to the number of all standby stations. The proceed-to-assign signal is received by the selected access units and a channel assignment signal is broadcast indicating the assigned channel. On receiving it, each station is switched to the assigned channel and one of the stations in each area transmits an end-of-switching signal to cause the access units to broadcast ringing signals containing the identifiers of the alerted stations. In response to a given cordless station going off hook, an off-hook signal is sent from it and copied by the associated access unit for transmission to the main controller, which returns a turn-on signal to allow the given station to activate its speech circuit.

6 Claims, 9 Drawing Sheets

ACCESS UNIT 4k

CORDLESS STATION 5

MAIN CONTROLLER 2

ACCESS UNIT 4

ACCESS UNIT 4

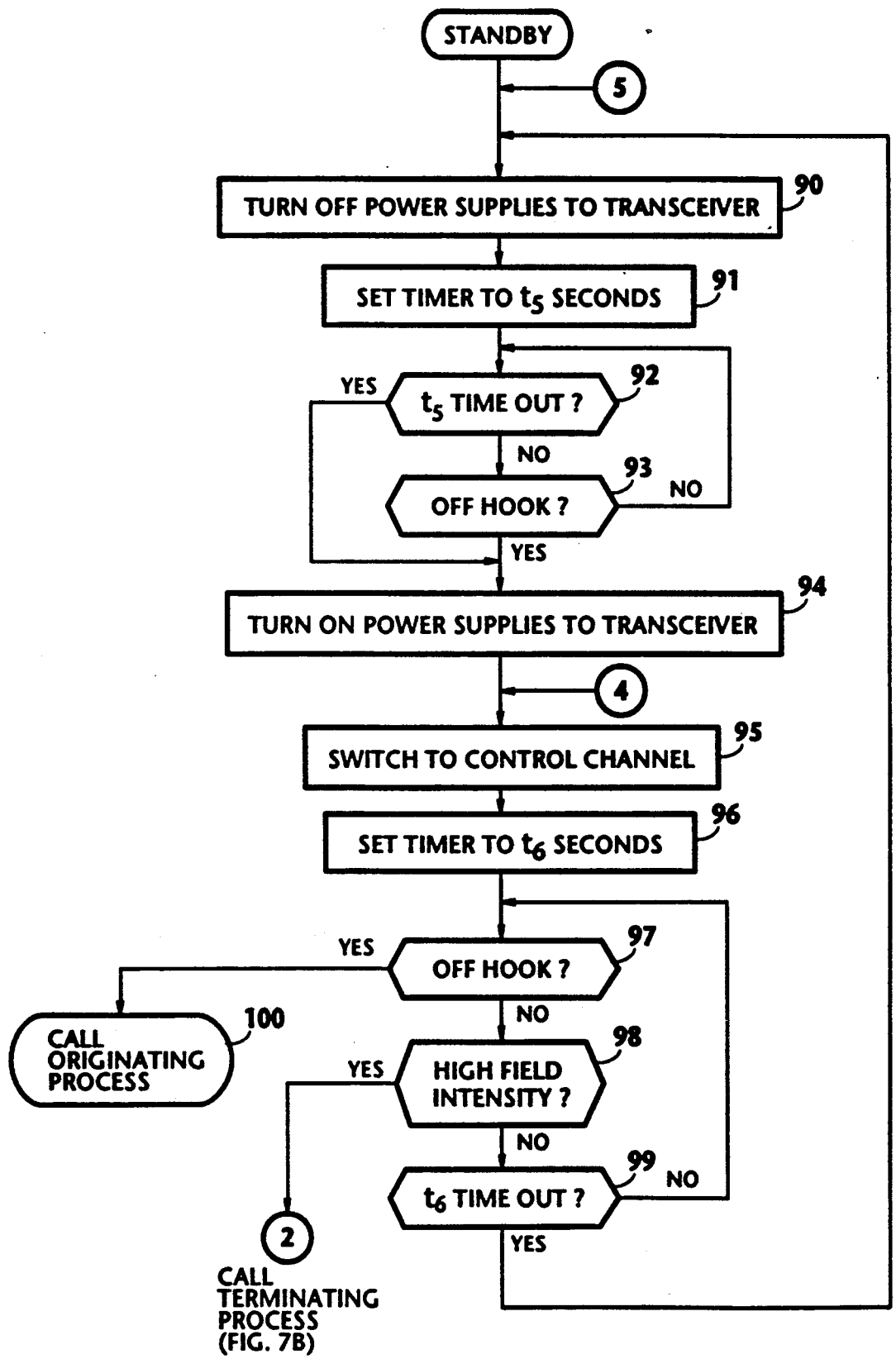

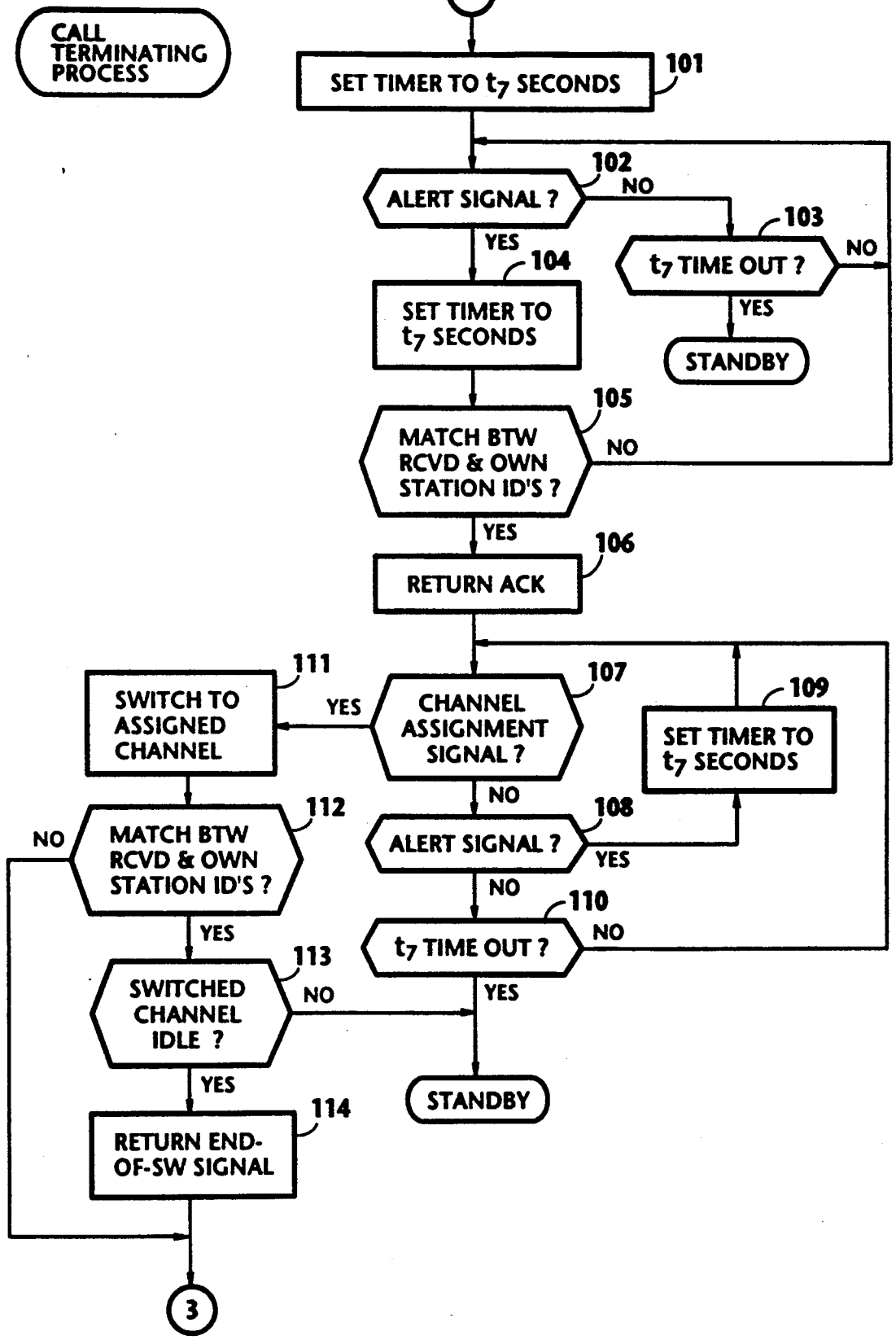

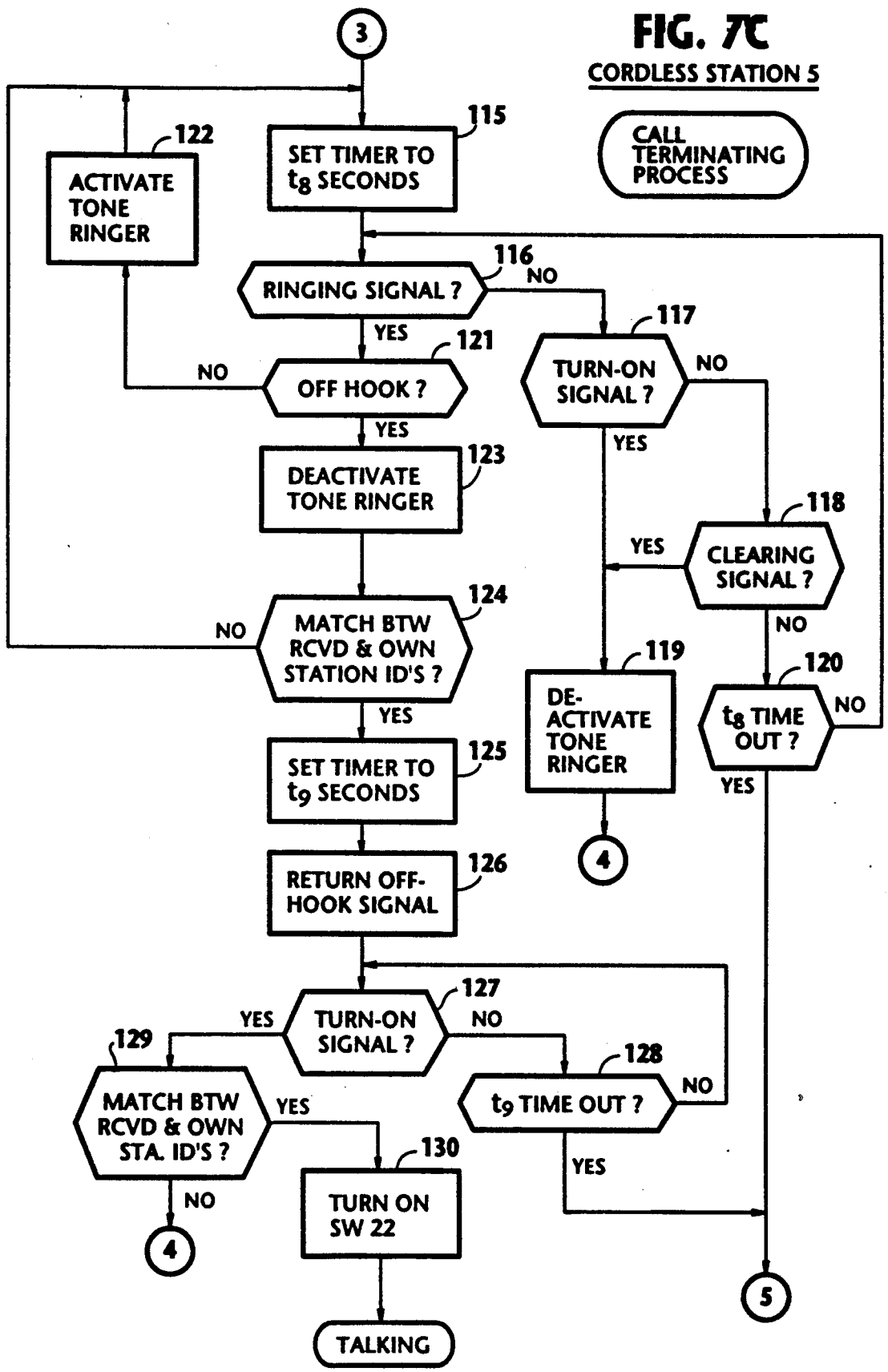

016
CORDLESS KEY TELEPHONE SYSTEM CAPABLE OF QUICKLY ANSWERING INCOMING CALLS

BACKGROUND OF THE INVENTION

The present invention relates to a cordless key telephone system.

Cordless key telephone systems have been in use today replacing wired key telephone systems as they considerably reduce the amount of cables and wires laid on office floors the arrangement of which must be altered to meet current needs of working environment. The system includes a main controller which is coupled to the public or private switched telephone network via subscriber loops to receive incoming calls and originate outgoing calls. The floor space which the system covers is divided into several service areas. One or more access units are located in each service area and coupled to the main controller to exchange control signals with it. In response to an incoming call, the main controller selects one access unit for each service area and sends an alert signal to it. Each selected access unit then broadcasts a recurrent sequence of alert signals respectively containing the identifiers of all standby cordless stations to elicit a response therefrom. Each standby cordless station responds to the alert signal addressed to it by returning an acknowledgment signal containing in it the own station identifier as well as the system identifier. Each selected access unit waits until it receives the acknowledgment signals from all standby cordless stations and communicates this fact to the main controller. The main controller waits for this communication from each selected access unit to return a proceed-to-assign signal to allow it to broadcast a channel assignment signal to switch the standby cordless stations to an assigned speech channel on which ringing signals will then be transmitted. If this communication is not received within a prescribed timeout period, the main controller automatically sends the proceed-to-assign signal to each selected access unit. When one of the cordless station goes off hook, this fact is signaled by the associated access unit to the main controller, whereupon it establishes a connection between the network and the access unit from which the off-hook condition is signaled.

Since the cordless stations may roam across the boundaries between the service areas of the system and since the access units have no way of knowing this fact, the timeout period for receiving acknowledgments from all stations often expires, resulting in a delayed action for answering an incoming call.

In addition, it is the usual practice to include a battery savings circuit in the cordless stations. Upon completion of an incoming call to a certain standby cordless station, the other standby cordless stations are automatically switched to the battery savings mode. If another incoming call is received immediately following the previous call, however, all other cordless stations are in their battery savings mode and there is an inevitable delay in alerting the stations until their power supplies are turned on again.

SUMMARY OF THE INVENTION

It is therefore an object of the present invention to provide a cordless key telephone system which is capable of answering incoming calls without wasting time.

According to the present invention, there is provided a cordless key telephone system having a plurality of access units divided into groups corresponding respectively to service areas for broadcasting radio signals on a two-way control channel or on an assigned two-way speech channel, a plurality of cordless stations having unique identifiers for exchanging radio signals with the access units, and a main controller coupled to a switched telephone network for selecting one of the access units for each of the service areas in response to an incoming call from the network and transmitting a first alert signal to the selected access units. According to this invention, each access unit responds to the first alert signal by sequentially broadcasts second alert signals respectively containing the identifiers of standby cordless stations. The second alert signal is received by each standby cordless station and an acknowledgment signal is transmitted therefrom if the received second alert signal contains the identifier of the station. The acknowledgment signal is received by and a copy thereof is transmitted from each of the selected access units to the main controller. The copy of the acknowledgment signal is received by the main controller, whereupon it transmits a proceed-to-assign signal to the selected access units if the number of the received copies of the acknowledgment signals is equal to the number of all standby cordless stations. The proceed-to-assign signal is received by the selected access units and a channel assignment signal is broadcast indicating the assigned channel and the selected access units are switched from the control channel to the assigned speech channel. On receiving the channel assignment signal, each standby cordless station switches from the control channel to the assigned speech channel and one of the standby stations which are located in each of the areas transmits an end-of-switching signal. In response to the end-of-switching signal, each of the selected access units broadcasts ringing signals respectively containing the identifiers of the cordless stations which have transmitted the acknowledgment signals. On receiving the ringing signal, each cordless station generates a ringing tone if the received ringing signal contains the identifier of the station. One of the alerted cordless stations transmits an off-hook signal if it goes off hook. The off-hook signal is received by the associated access unit and a copy of the off-hook signal is sent to the main controller. A turn-on signal is then transmitted from the main controller as a response to the copy of the off-hook signal, the turn-on signal containing the identifier of the cordless station going off hook. In response to the turn-on signal, a copy of this signal is broadcast from the access unit and received by the cordless station going off hook to activate its speech circuit.

Since the proceed-to-assign signal is transmitted from the main controller to the selected access units at the moment when acknowledgment signals from all standby cordless stations are received by the main controller, the time taken to answer incoming calls from the network can be significantly reduced.

According to another feature of this invention, each cordless station is switched from the assigned speech channel to the control channel for a prescribed period of time if it receives a copy of the turn-on signal which does not contain the identifier of the station and periodically turns off its power supplies to power draining units following the end of the prescribed period. In a modified embodiment, upon receipt of the copy of the off-hook signal, a proceed-to-clear signal is transmitted from the main controller to the selected access units other than one from which it received the copy of the off-hook signal to cause them to broadcast clearing signals respectively containing the identifiers of the cordless stations not going off hook. In response to the clearing signal, the addressed cordless station is switched from the assigned speech channel to the control channel for a prescribed period of time and periodically turns off power supplies to its power draining units following the end of the prescribed period.

BRIEF DESCRIPTION OF THE DRAWINGS

The present invention will be described in further detail with reference to the accompanying drawings, in which:

FIGS. 7A to 7C show a sequence of programmed instructions performed by the cordless stations.

DETAILED DESCRIPTION

Figure 1:
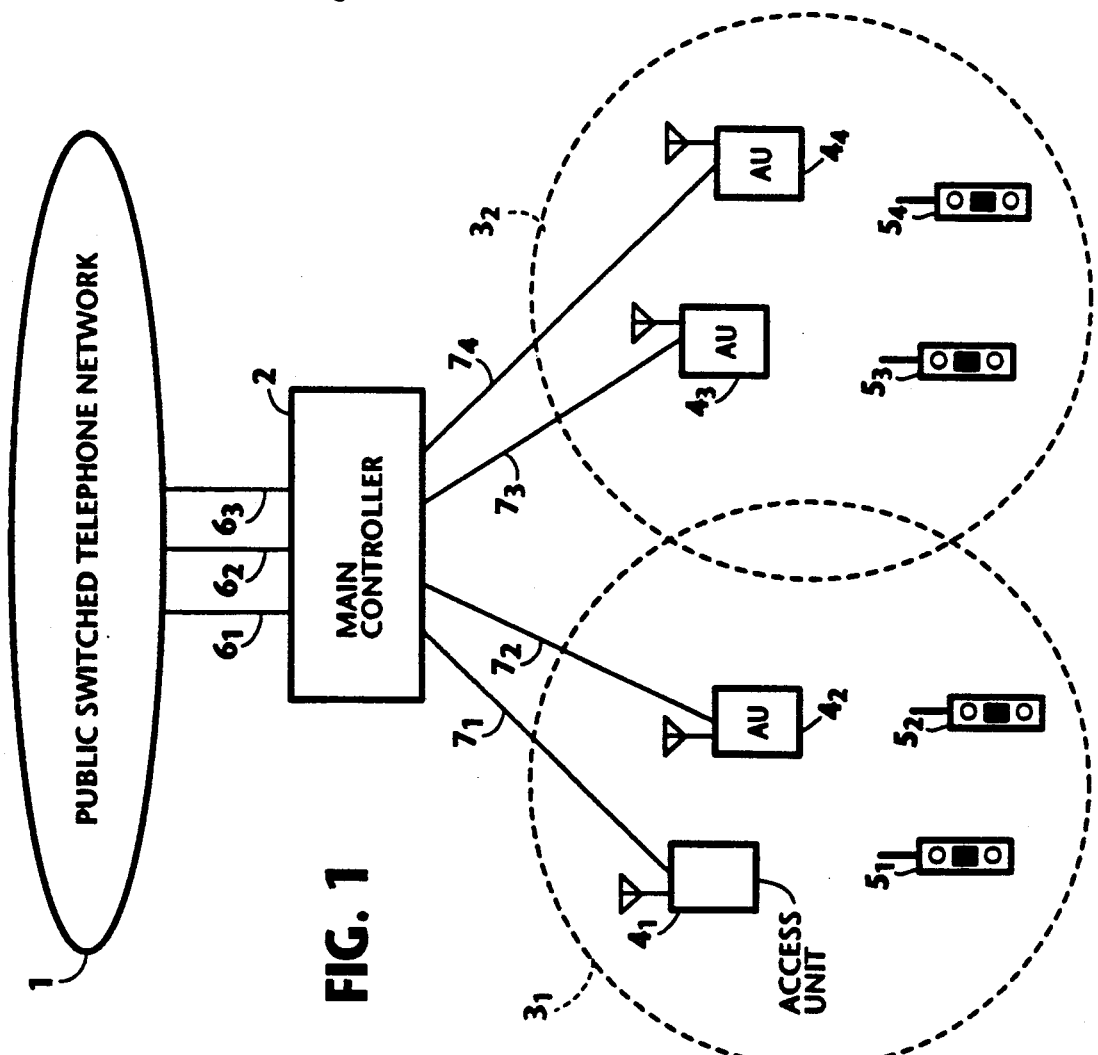
FIG. 1 shows in block form a cordless key telephone system embodying the present invention.

Referring now to FIG. 1, there is shown a cordless key telephone system according to the present invention. The system includes a main controller 2 connected to the public telephone network 1 via three subscriber lines $6_1$ through $6_3$, for example. Main controller 2 is further connected by local lines $7_1 \sim 7_4$ to access units $4_1 \sim 4_4$ which are divided into two groups corresponding to service areas $3_1$ and $3_2$ and located at strategic points of the corresponding service areas. The system has four cordless stations $5_1$ through $5_4$, for example, which may roam across the boundaries between service areas $3_1$ and $3_2$. A two-way control channel is provided between the access units and cordless stations. During standby modes, all access units and cordless stations are switched to the control channel to constantly monitor the signals carried on that channel. During a call origination or termination phase, the control channel is used to exchange control signals to assign a two-way speech channel.

Figure 2:
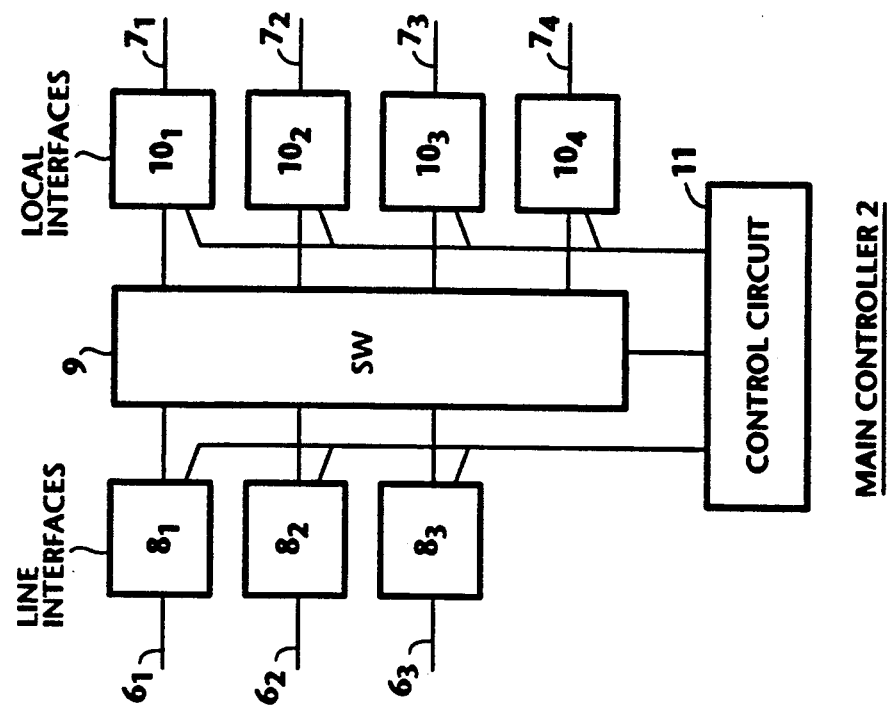
FIG. 2 shows details of a main controller.

As shown in FIG. 2, main controller 2 comprises line interfaces $8_1 \sim 8_3$ respectively coupled via subscriber lines $6_1 \sim 6_3$ to the network 1, local interfaces $10_1 \sim 10_4$ respectively coupled to local lines $7_1 \sim 7_4$, and a switching matrix 9 for establishing a connection between the interfaces 8 and 10. A control circuit 11 is coupled to all interfaces 8 and 10 to supply a switching control signal to matrix 9 in a manner as will be described.

Figure 3:
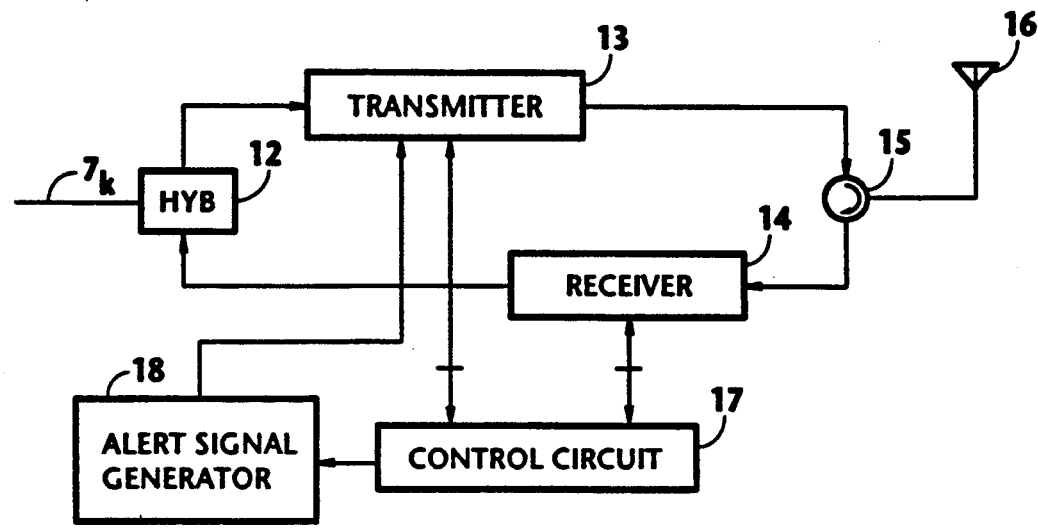
FIG. 3 shows details of an access unit.

As illustrated in FIG. 3, each access unit $4_k$ includes a hybrid 12 having its two-wire circuit coupled to the associated local line $7_k$. The transmit portion of the four-wire circuit is coupled to the input of a transmitter 13, the receive portion of the four-wire circuit being coupled to the output of a receiver 14. The output of transmitter 13 is coupled via a duplexer 15 to an antenna 16 for transmission to cordless stations. Signals received by an antenna 16 from cordless stations are coupled by duplexer 15 to the input of receiver 14 for transmission to main controller 2. A frequency synthesizer is included in transmitter 13 and receiver 14 to receive control signals transmitted on the control channel from both sides of the access unit for coupling to a control circuit 17. In a manner to be described, control circuit 17 processes the received control signals and generates control signals for transmission to either side of the unit. An alert signal generator 18 is connected to the control circuit to generate station alert signals in succession to all cordless stations of the system in response to an enable signal from control circuit 17. Each alert signal contains the system identifier and the identifier of each cordless station. The output of alert signal generator 18 is applied to transmitter 13 for transmission to cordless stations.

Figure 4:
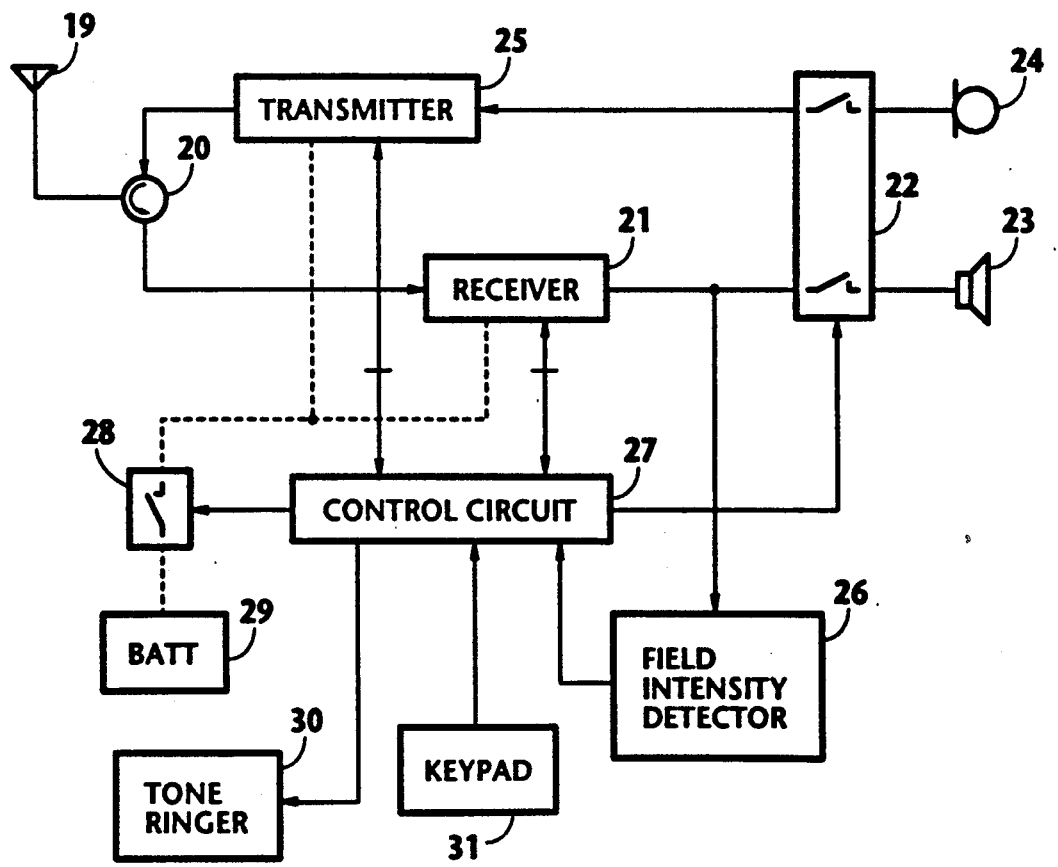
FIG. 4 shows details of a cordless station.

In FIG. 4, signal from the nearby access unit is detected by an antenna 19 of each cordless station $5_k$ and passed through a duplexer 20 to a receiver 21 where it is converted to an audio-frequency signal and applied through a normally open switching circuit 22 to an earphone 23. Signal from microphone 24 is coupled through switching circuit 22 to a transmitter 25 where it is converted to a high-frequency signal and applied through duplexer 20 to antenna 19. A field intensity detector 26 is connected to receiver 21 to compare the field intensity of the cordless station with a prescribed threshold and applies an output signal to a control circuit 27 if the field intensity is higher than the threshold. As will be described, control circuit 27 exchanges control signals with receiver 21 and transmitter 25 by tuning their frequency synthesizers to the control channel and switching to a speech channel when it is assigned by the communicating access unit. For power savings purposes, a power switch 28 is controlled by control circuit 27 to cut off power supplies from a battery 29 to receiver 21 and transmitter 25. A tone ringer 30 is connected to control circuit 27 to audibly alert the user upon receipt of an incoming call from the network. A keypad 31 is also connected to control circuit 27 to generate an off-hook signal when answering an incoming call or generate a connection request as well as destination address information when originating an outgoing call.

Each of the respective control circuits of main controller 2, access units 4 and cordless stations 5 is a microprocessor-based controller which is programmed to perform a stored sequence of instructions as described hereinbelow.

FLOWCHARTS

Figure 5:
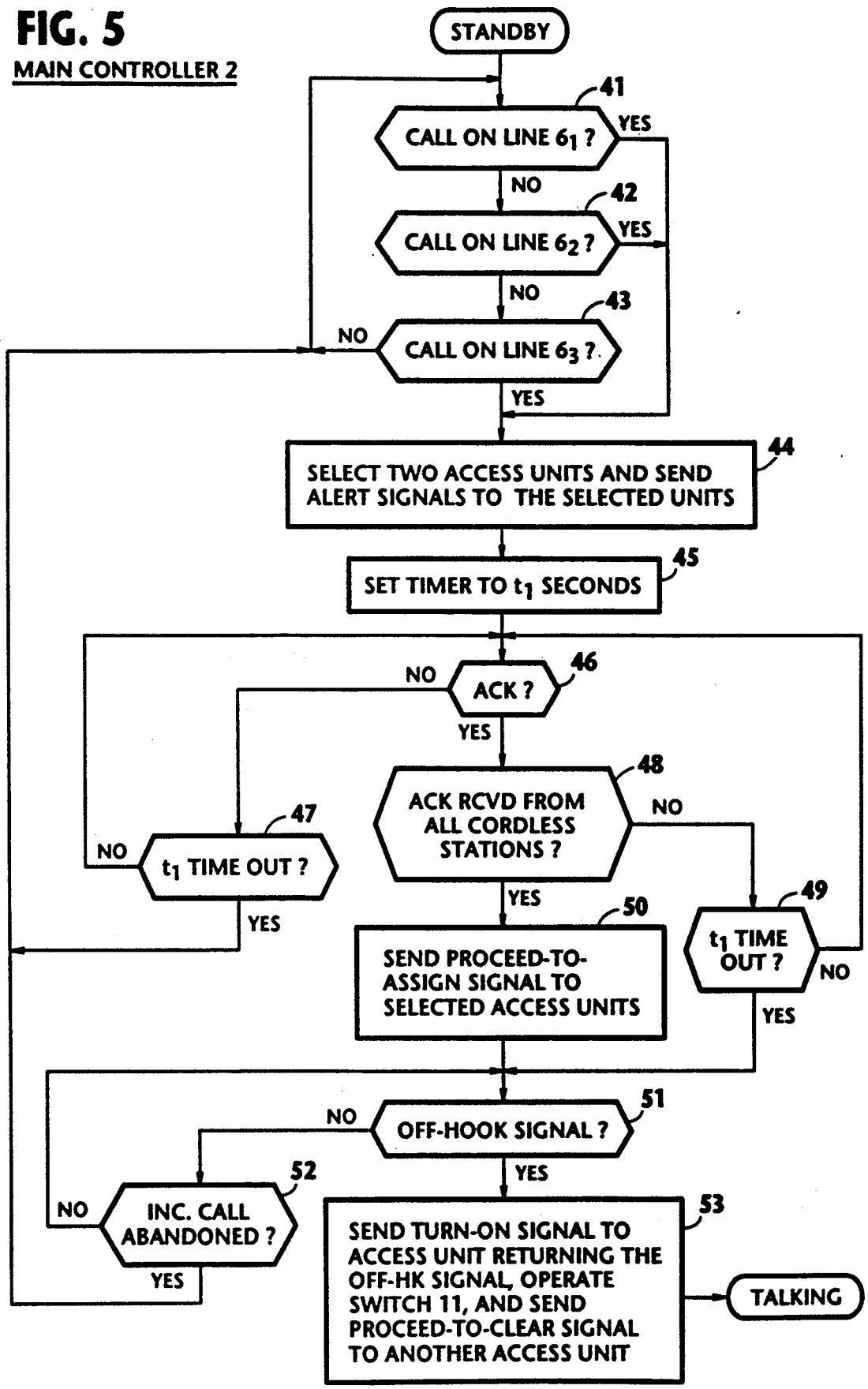
FIG. 5 shows a sequence of programmed instructions performed by the main controller.

In FIG. 5, main controller 2 initiates program execution with sequential steps 41, 42 and 43 which check in succession for the presence of an incoming call from the network on one of subscriber lines $6_1$, $6_2$ and $6_3$. If there is one, control proceeds to step 44 to select two access units one for each service area and send a first alert signal to both of the selected access units in order to wait for copied versions of acknowledgment (ACK) signals from cordless stations which are in a standby state. As will be described, each selected access unit responds to this alert signal by broadcasting a recurrent sequence of second alert signals containing respective identifiers of all standby cordless stations to notify the arrival of an incoming call, not knowing which cordless stations are within their own service area. Therefore, as many ACK signals are returned from each access unit as there are standby cordless stations within the service area of the access unit.

Following step 44, a timer is set equal to a period of $t_1$ seconds (step 45) and a check is made for the presence of an acknowledgment signal (ACK) from access units 4 (step 46). If there is none, control repeats step 46 after checking for the expiration of timeout period $t_1$ (step 47), and if there is one, exit is to step 48 to check to see if ACK signals are received from all standby cordless stations. If the answer is negative, steps 46 and 48 are repeated until the timeout period $t_1$ expires (step 49), and if the answer is affirmative, control moves ahead to step 50 to send a proceed-to-assign signal to the selected access units, and proceeds to decision step 51 to check to see if an off-hook signal is returned from one of the selected access units. If the timeout period $t_1$ expires at step 47, control returns to step 41 to repeat the process, and if it expires at step 49, control exits to step 51.

As will be described, the proceed-to-assign signal allows each access unit to assign a common speech channel to the incoming call and to switch the access unit and cordless stations to the assigned speech channel so that the cordless stations can receive ringing signals from the access unit.

If the answer is negative in step 51, this step is repeated until the incoming call is abandoned from the network side of the connection (step 52), and if the answer is affirmative, control advances to step 53 to transmit a speech-circuit turn-on signal (containing in it the system identifier and the identifier of the station from which the off-hook signal has returned) to the access unit which has returned the off-hook signal, operates matrix switch 9 to establish a connection to trip the ringing signal from the network, and transmits a proceed-to-clear signals to the other of the selected access units in order to clear ringing signals supplied from it to cordless stations. Following step 53, main controller 2 enters a talking mode with respect to the incoming call.

Figure 6A:
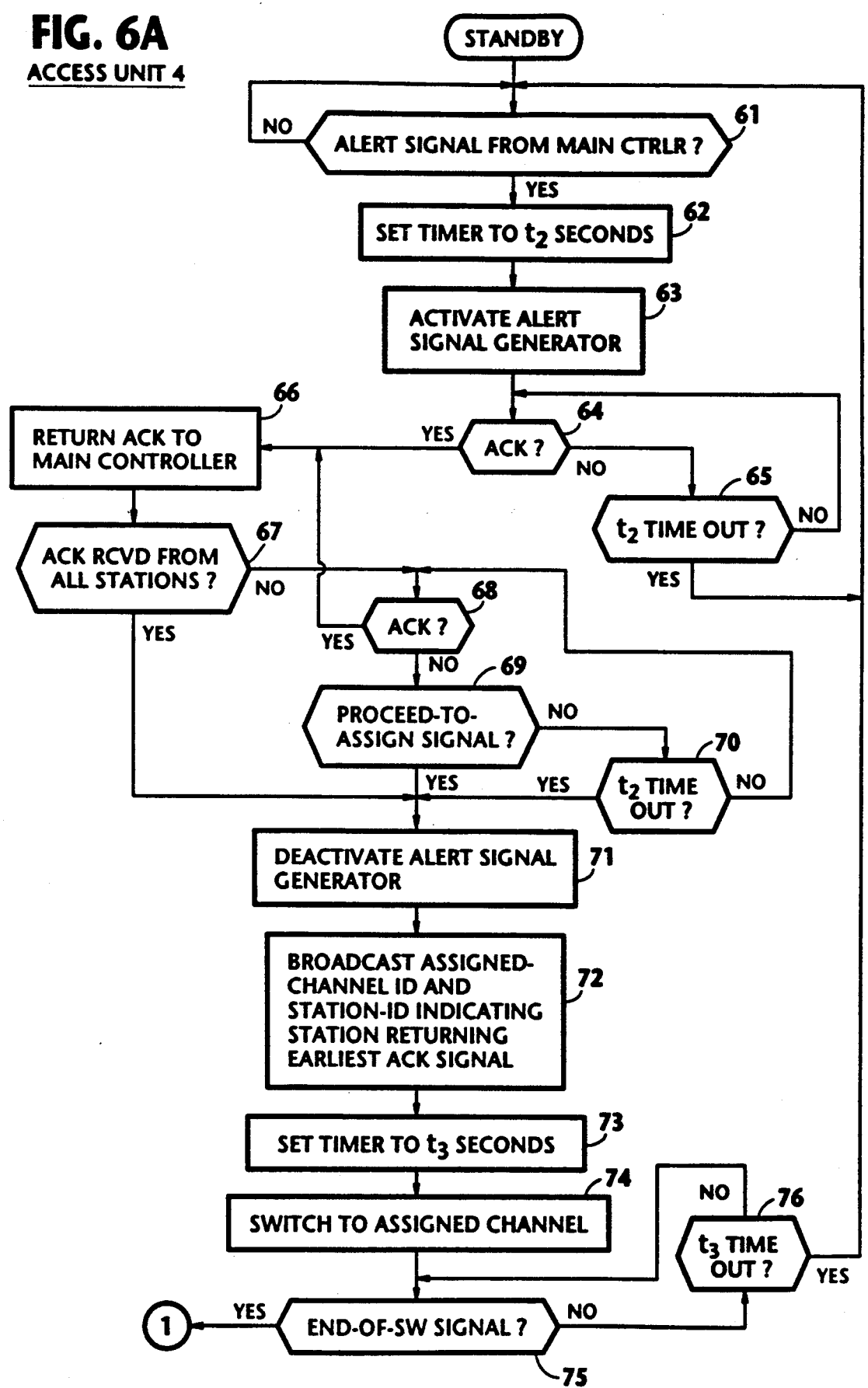
FIGS. 6A and 6B show a sequence of programmed instructions performed by the access units.

In FIG. 6A, if an access unit 4 is in a standby mode, it initiates program execution with step 61 to check for the presence of an alert signal from main controller 2. If the answer is affirmative, exit is to step 62 to set a $t_2$-second timeout period and activate the alert signal generator 18 to broadcast station alert signals to all cordless stations (step 63) to elicit a response from each station. Exit then is to step 64 which checks for the presence of an ACK signal from a cordless station which responded to the alert signal addressed to it. If no ACK is received within the $t_2$-second timeout period (steps 64 and 65), control returns to the starting point of the program, recognizing that there is no standby cordless station within the own service area. If the answer in step 64 is affirmative, control goes to step 66 to return an ACK signal to main controller 2 and proceeds to step 67 to check to see if ACK signals are received from all cordless stations of the system. If the answer is negative, control exits to step 68 to repeat a check for the presence of an ACK signal. If there is one, control returns to step 66; otherwise, it advances to step 69 to check to see if a proceed-to-assign signal is received from main controller 2. If the answer is negative, steps 68 and 69 are repeated until the timeout period $t_2$ expires (step 70).

If the decision in step 67, 69 or 70 is affirmative, control advances to step 71 to deactivate the alert signal generator 18. Exit then is to step 72 to broadcast a channel assignment signal containing the identifier of a speech channel to be assigned to the incoming call and the identifier of the cordless station which responded with the earliest of the ACK signals from cordless stations located in the same service area. Exit then is to steps 73 and 74 to set a $t_3$-second timeout period and switch to the assigned speech channel. Control proceeds to step 75 to check for the reception of an end-of-switching signal from the cordless station identified by the channel assignment signal. If this signal is not received within the $t_3$-second timeout period (steps 75 and 76), control returns to the starting point of the program.

If the answer is affirmative in step 75, exit then is to step 77 (FIG. 6B) to broadcast ringing signals in sequence to those cordless stations which returned ACK signals. To avoid undesirable effect caused by a collision between simultaneous occurrences of call answering attempts, the ringing signals contain the respective station identifiers of such cordless stations by allowing only one of the stations to return an off-hook signal. Control goes to step 78 to check for the presence of a proceed-to-clear signal from main controller 2. If this is the case, control exits to step 79 to broadcast a clearing signal to clear the ringing signals. If the answer is negative in step 78, control exits to step 80 to check for the presence of an off-hook signal from a cordless station. Steps 78 and 80 are repeated if no off-hook signal is received. If the answer is affirmative in step 80, exit is to step 81 to return an off-hook signal to main controller 2 to allow it to supply a turn-on signal (step 53, FIG. 5). A $t_4$-second timeout period is then set (step 82). Decision step 83 follows to check for the reception of a turn-on signal from main controller 2. Step 83 is repeated until $t_4$-second timeout period expires (step 84) and exits the loop to enter a standby state. If the answer is affirmative in step 83, step 85 is executed by broadcasting a turn-on signal containing in it the identifier of the cordless station which has transmitted the off-hook signal, and control enters a talking mode.

In FIG. 7A, if a cordless station is in a standby mode, it begins its program execution with step 90 by turning off power switch 28 to cut off power supplies to transceiver (transmitter 25 and receiver 21) for battery savings purposes. Exit then is to step 91 to set a $t_5$-second timeout period. Steps 92 and 93 are sequentially executed to check for the expiration of the $t_5$-second timeout period and check to see if the cordless station goes off hook. If the station goes off hook or $t_5$-second period expires before the station goes off hook, control moves ahead to step 94 to turn on power switch 28 to activate the transceiver, and proceeds to step 95 to switch its frequency synthesizers to the control channel. A $t_6$-second timeout period is then set (step 96) and the presence of an off-hook condition of the cordless station is again checked (step 97). If the cordless station goes off hook when step 97 is being executed, the user's attempt is a call origination and control moves to a call originating subroutine 100. If no off-hook condition is detected by step 97, a check is made (step 98) for the presence of an output signal from field intensity detector 26 indicating that an incoming call is received. If the answer is negative in step 98, steps 97, 98 are repeated until the $t_6$-second timeout period expires (step 99). If this timeout period expires, control returns to the starting point of the program to repeat the battery savings process.

If the answer is affirmative in step 98, control exits to step 101 (FIG. 7B) to set a $t_7$-second timeout period and goes to step 102 to check for the presence of a station alert signal addressed to the own key telephone system. Since the system has four registered cordless stations, four station alert signals are sequentially received by each cordless station. If no alert signal is received following the generation of an output signal from high intensity detector 26, the $t_7$-second period will expire (step 103) and the station enters a standby mode. If an alert signal is received, control exits to step 104 to set the $t_7$-second timeout period again and proceeds to step 105 to check to see if there is a match between the station identifier contained in the received alert signal and the own station identifier. If there is no match, control returns to step 102 to repeat the process. If the answer is affirmative in step 105, control exits to step 106 to return an ACK signal to the access unit. This ACK signal contains the system identifier and the identifier of the own cordless station. The transmission of this ACK signal will cause the corresponding access unit to deactivate the alert signal generator 26 (step 71, FIG. 6A) and broadcast a channel assignment signal (step 72).

Exit then is to step 107 to check for the presence of an channel assignment signal from the access unit. If no channel assignment signal is received, control proceeds to step 108 to check for the presence of a station alert signal. If any of the alert signals of the system is received, the $t_7$-second timeout period is set up again (step 109), with control returning to step 107. If the decisions in steps 107 and 108 are both negative during the timeout period of $t_7$ seconds (step 110), control enters a standby state.

Figure 6B:
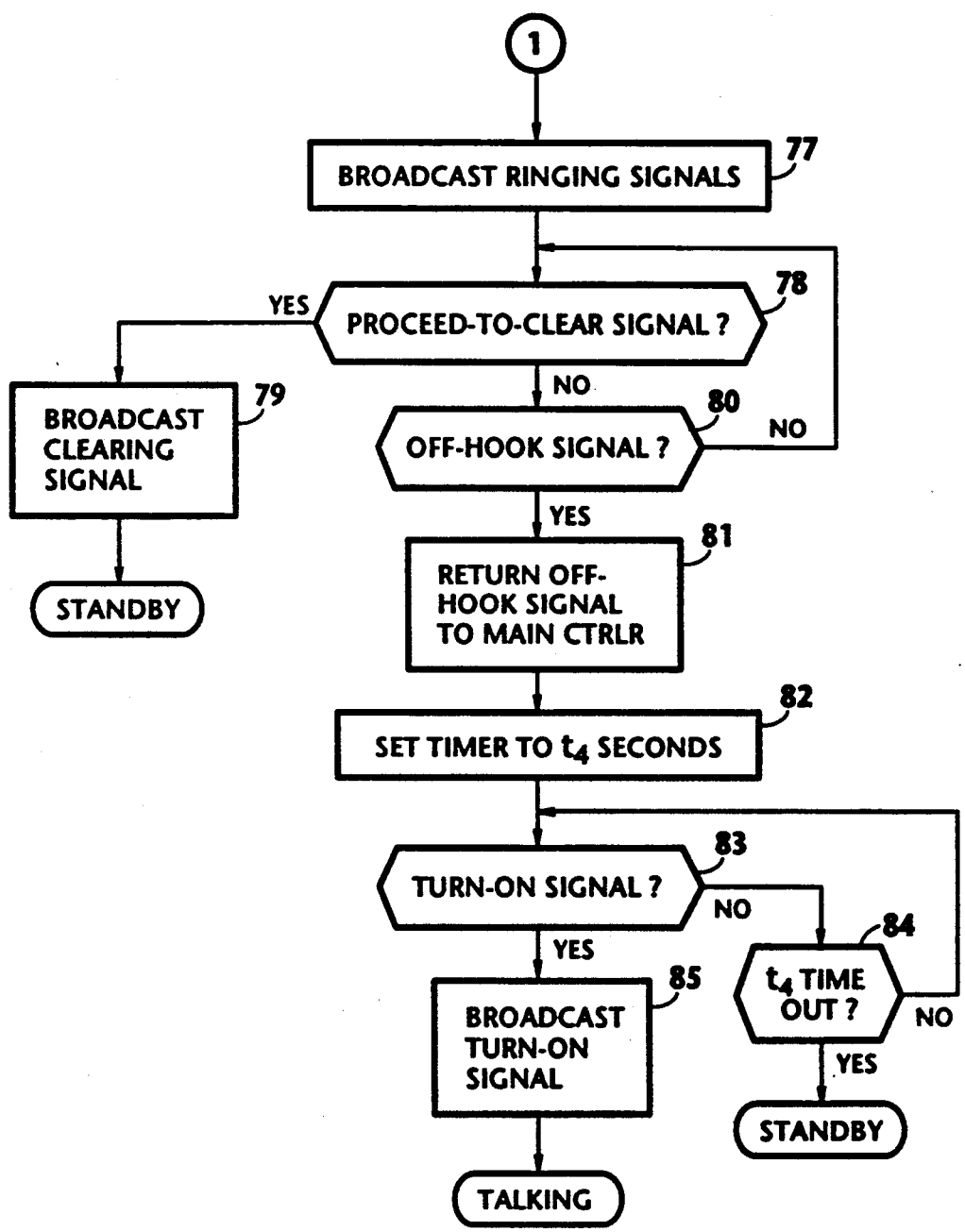

If the decision in step 107 is affirmative, control exits to step 111 to switch the frequency synthesizers of the cordless station to a speech channel indicated by the received channel assignment signal. Control then moves to step 112 to check to see if the station identifier contained in the channel assignment signal matches the identifier of the own cordless station. If it is, control advances to step 113 to check to see if the switched speech channel is in an idle state. If not, control enters a standby mode. If the switched speech channel is idle, control exits to step 114 to return an end-of switching signal to the access unit, allowing it to proceed to step 77 to broadcast ringing signals (FIG. 6B).

Exit then is to step 115 (FIG. 7C) to set up a $t_8$-second timeout period for successive detection of a ringing signal (step 116) and a turn-on signal (step 117) and a clearing signal (step 118) until the timeout period of $t_8$ seconds expires (step 120), whereupon control returns to step 95. If the turn-on signal is received (step 117) or if the clearing signal is received (step 118), control proceeds to step 119 for deactivating the tone ringer and returns to step 95. Steps 117 through 120 are executed by stations which do not go off hook. If the ringing signal is received (step 116), control proceeds to step 121 to check to see if the own station goes off hook. If negative decision is made in step 119, control activates tone ringer 30 (step 121) to alert the users, and returns to step 115.

When the station goes off hook, control exits to step 123 to deactivate the tone ringer and proceeds to step 124 to detect a match between the station identifier transmitted by the received ringing signal and the own station identifier. If they fail to match, control returns to step 115, and if a match occurs, control proceeds to step 125 to set the timer to a timeout period of $t_9$ seconds, and proceeds to step 126 to return an off-hook signal containing in it the system identifier and the identifier of the cordless station. Thus, if more than one cordless station goes off hook, the off-hook signal is transmitted only from one of such stations. The transmission of the off-hook signal from the cordless station causes the corresponding access unit to proceed to step 81 (FIG. 6B) to transmit a copy of the received off-hook signal to main controller 2. On receiving this copy of off-hook signal, main controller 2 proceeds to step 53 (FIG. 5) to return a turn-on signal to the access unit containing in it the system identifier and the identifier of the station going off hook, as well as a proceed-to-clear signal. On receiving this turn-on signal (step 83, FIG. 6B), the access unit broadcasts a copy of the received turn-on signal (step 85).

Exit then is to step 127 to check for the presence of a turn-on signal from the access unit. If this signal is not received within the timeout period $t_9$ (step 128), control enters a standby mode, and if it is received within this period, exits to step 129 to check for a match between the station identifier contained in the turn-on signal and the own identifier. If the answer is affirmative, control exits to step 130 to close the normally open switching circuit 22 and enters a talking mode. If there is a mismatch, control returns to step 95 to switch the cordless station to the control channel in order to receive the next incoming call which may immediately follow.

OPERATION

Figure 8:
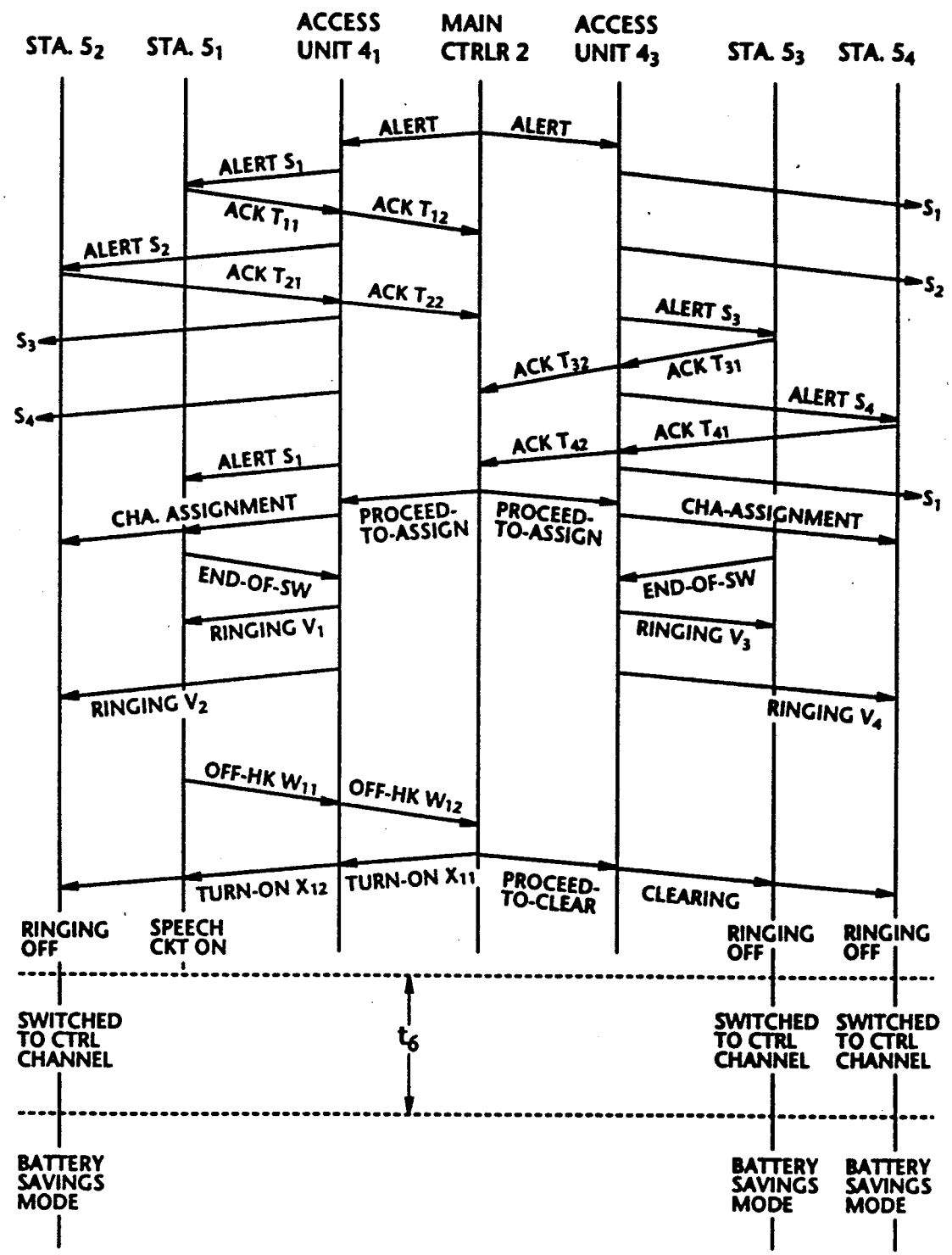
FIG. 8 shows a sequence of signals exchanged through the system in response to an incoming call from the switched telephone network.

The operation of the system will now be described with reference to the drawings described above together with FIG. 8. Assume that cordless stations $5_1$ and $5_2$ are located in service area $3_1$ and the other cordless stations are located in service area $3_2$ when an incoming call is received on subscriber line $6_1$ from the network and that all cordless stations are in a standby state executing the battery savings steps 90 to 99.

The incoming call is detected by line interface $8_1$ of main controller 2, and this fact is communicated to control circuit 11 (step 41, FIG. 5), which proceeds to select one access unit for each service area, say, access units $4_1$ and $4_3$ for service areas $3_1$ and $3_2$, respectively, and transmits alert signals to the selected units (step 44) from local interfaces $10_1$ and $10_3$ via local lines $7_1$ and $7_3$. More specifically, the alert signal from local interface $10_1$, for example, is supplied to transmitter 13 of access unit $4_1$ and fed into control circuit 17 (step 61, FIG. 6A) and a recurrent sequence of station alert signals $S_1$, $S_2$, $S_3$ and $S_4$ (FIG. 8) are generated by alert signal generator 18 and broadcast from transmitter 13 by antenna 16 to cordless stations $5_1$ and $5_2$ following the setup of a $t_2$-second timeout period (steps 62 and 63). Station alert signals $S_1$, $S_2$, $S_3$ and $S_4$ respectively address to all cordless stations $5_1$, $5_2$, $5_3$ and $5_4$ of the system. Likewise, the same station alert signals are recurrently broadcast from access unit $4_3$ to cordless stations $5_3$ and $5_4$.

If field intensity detector 26 produces a high-intensity signal (step 98, FIG. 7A), the station alert signals from access unit $4_1$ are detected by the antenna 19 and supplied through receiver 21 of each cordless station to control circuit 27 in which their station identifiers are compared with the identifier of the own station to detect a match between them (steps 102~105, FIG. 7B). When there is a match (step 105), an acknowledgment (ACK) signal $T_{31}$ is transmitted (step 106) from transmitter 25 by antenna 19 of station $5_3$ to access unit $4_3$ and ACK signal $T_{41}$ is transmitted in succession from station $5_4$ to access unit $4_3$. In a similar manner, ACK signal $T_{11}$ is transmitted from station $5_1$ to access unit $4_1$ and ACK signal $T_{21}$ is transmitted in succession to access unit $4_1$. ACK signals $T_{11}$, $T_{21}$, $T_{31}$ and $T_{41}$ contain the system identifier and the respective station identifiers as described above.

ACK signals $T_{11}$ and $T_{21}$ are received by the receiver 14 of access unit $4_1$ and supplied to its control circuit 17 in which they are examined to see if they contain the same system identifier as that of the own key telephone system (step 64, FIG. 6A). Likewise, ACK signals $T_{31}$ and $T_{41}$ are received and examined by access unit $4_3$. In response to ACK signal $T_{11}$, a copy of this signal is returned from access unit $4_1$ to main controller 2 as an ACK signal $T_{12}$ (step 66) and in response to the next ACK signal $T_{21}$, a copy of this signal is returned from access unit $4_1$ to main controller 2 as an ACK signal $T_{22}$ (steps 67, 68 and 66) to wait for the reception of a proceed-to-assign signal from main controller 2 (step 69). In a similar manner, a copy $T_{32}$ of ACK signal $T_{31}$ and a copy $T_{42}$ of ACK signal $T_{41}$ are successively returned from access unit $4_3$ to wait for the proceed-to-assign signal. Note that the order of ACK signals returning from cordless stations may vary depending on the independent timing of their battery savings operations, so that under certain circumstances ACK signal $T_{31}$ may arrive first in response to a first sequence of alert signals and $T_{21}$ may arrive last in response to a second sequence of alert signals.

On receiving ACK signals from all standby cordless stations (step 48, FIG. 5), main controller 2 sends a proceed-to-assign signal to the selected access units $4_1$ and $4_3$ (step 50).

It is seen that, since the proceed-to-assign signal is generated at the instant when ACK signals corresponding to those from all cordless stations are received by main controller 2, the call terminating process can proceed further to promptly answer the incoming call.

In response to the proceed-to-assign signal (step 69, FIG. 6A), access units $4_1$ and $4_3$ turn off their alert signal generator 18 (step 71) and broadcast a channel assignment signal (step 72) containing an assigned speech-channel identifier and the identifier of a cordless station which returned the ACK signal of the earliest arrival in each service area, (i.e., station $5_1$ for access unit $4_1$ and station $5_3$ for access unit $4_3$), switch to the assigned speech channel (step 74). Access unit $4_1$ now waits for an end-of-switching signal from cordless station $5_1$ (step 75) during timeout period $t_3$ and access unit $4_3$ waits for an end-of-switching signal from cordless station $5_3$.

On receiving the channel assignment signal from access unit $4_1$ (step 107, FIG. 7B), cordless stations $5_1$ and $5_2$ switch to the assigned speech channel (step 111) and checks to see if the station identifier contained in the channel assignment signal matches the own station identifiers (step 112). Thus, cordless station $5_1$ exits to step 113 to check to see if the assigned channel is idle, and if it is, returns an end-of-switching signal to access unit $4_1$ (step 114). After setting timeout period $t_8$, cordless stations $5_1$ and $5_2$ wait for a ringing signal from access unit $4_1$ (steps 115 and 116, FIG. 7C). Likewise, cordless stations $5_3$ and $5_4$ switch to the assigned speech channel in response to the channel assignment signal. Station $5_3$ returns an end-of-switching signal to access unit $4_3$ (step 114). Stations $5_3$ and $5_4$ wait for respective ringing signals from access unit $4_3$ after setting timeout period $t_8$.

In response to the respective end-of-switching signals from cordless stations $5_1$ and $5_3$ (step 75, FIG. 6A), access units $4_1$ and $4_3$ broadcast ringing signals each containing the system identifier and the respective station identifier (step 77, FIG. 6B), so that ringing signals $V_1$ and $V_2$ are transmitted to cordless stations $5_1$ and $5_2$, respectively, and ringing signals $V_3$ and $V_4$ are transmitted to cordless stations $5_3$ and $5_4$, respectively.

In response to each ringing signal, each cordless station activates its tone ringer 30 to alert the user (steps 116, 121 and 122, FIG. 7C). If cordless station $5_1$ goes off hook (step 121), it turns off its tone ringer (step 123), detects a match between the station identifier contained in the ringing signal and the own station identifier (step 124), and returns an off-hook signal $W_{11}$ to access unit $4_1$ (step 126) to wait for a turn-on signal.

On receiving the off-hook signal $W_{11}$ (steps 78 and 80, FIG. 6B), access unit $4_1$ returns a copy of the off-hook signal $W_{11}$ as an off-hook signal $W_{12}$ to main controller 2 (step 81).

Main controller 2 responds to the off-hook signal $W_{21}$ by returning a turn-on signal $X_{11}$ (steps 51 and 53, FIG. 5) to access unit $4_1$ and operating the switch 9 to establish a connection between line interface $8_1$ and local interface $10_1$, while transmitting a proceed-to-clear signal to access unit $4_3$.

In response to the turn-on signal $X_{11}$ (step 83, FIG. 6B), access unit $4_1$ broadcasts a copy $X_{12}$ of the turn-on signal $X_{11}$ (step 85) to enter a talking mode. Cordless station $5_1$ responds to this signal (step 127, FIG. 7C) by detecting a match between the station identifier contained in it and the own identifier (step 129) and turning on the switching circuit 22 to activate its speech circuit (step 130). Cordless station $5_2$ responds to turn-on signal $X_{12}$ when executing step 117 and turns off its tone ringer (step 119) leaving its switching circuit 22 in the off-state, and switches to the control channel (step 95) to receive the next incoming call which may immediately follow.

On the other hand, access unit $4_3$ broadcasts a clearing signal in response to proceed-to-clear signal (steps 78 and 79, FIG. 6B) and enters a standby state. Cordless stations $5_3$ and $5_4$ receive the clearing signal (step 118) and turns off their tone ringer (step 119) and switch to the control channel (step 95) to receive the next incoming call.

It is seen that when the incoming call is answered the standby cordless stations other than the station answering the call are switched to the control channel, rather than entering the battery savings routine, the system can quickly respond to the next incoming call which is handled by the access units other than that involved in establishing the previous call.

The foregoing description shows only one preferred embodiment of the present invention. Various modifications are apparent to those skilled in the art without departing from the scope of the present invention which is only limited by the appended claims. Therefore, the embodiment shown and described is only illustrative, not restrictive.

What is claimed is:

1. In a cordless key telephone system having a plurality of access units divided into groups corresponding respectively to service areas for broadcasting radio signals on a two-way control channel or on an assigned two-way speech channel, a plurality of cordless stations, and a main controller coupled to a switched telephone network for selecting one of the access units for each of said service areas in response to an incoming call from said network and transmitting a first alert signal to the selected access units, a method comprising the steps of:

a) receiving said first alert signal and, in response thereto, broadcasting from the selected access units a recurrent sequence of second alert signals over the control channel, the second alert signals respectively identifying standby cordless stations;

b) receiving the second alert signal and, in response thereto, transmitting an acknowledgment signal over the control channel from each cordless station if the received second alert signal identifies;

c) receiving the acknowledgement signal and, in response thereto, transmitting a copy thereof from each of the selected access units to said main controller;

d) receiving said copy of the acknowledgement signal from the selected access units and, in response thereto, transmitting a proceed-to-assign signal from said main controller to said selected access units if the number of the received copies of the acknowledgement signals is equal to the number of all standby cordless stations;

e) receiving said proceed-to-assign signal and, in response thereto, broadcasting a channel assignment signal over the control channel from said selected access units, said channel assignment signal identifying said assigned speech channel;

f) receiving said channel assignment signal and, in response thereto, transmitting an end-of-switching signal over the assigned channel from one of the cordless station which are located in each of said areas;

g) receiving said end-of-switching signal and, in response thereto, broadcasting from each of the selected access units ringing signals over the assigned speech channel, the ringing signals identifying the cordless stations, which have transmitted said acknowledgment signals;

h) receiving the ringing signal and, in response thereto, generating a ringing tone in each cordless station if the received signal identifies the cordless station and allowing an off-hook signal to be transmitted over the assigned speech channel from a replying cordless station;

i) receiving the off-hook signal and, in response thereto, transmitting a copy thereof from one of the selected access units to said main controller;

j) returning a turn-on signal from the main controller as a response to said copy of the off-hook signal, said turn-on signal identifying the replying cordless station;

k) receiving said turn-on signal and, in response thereto, broadcasting a copy thereof from said access unit; and l) causing said replying cordless station to receive said copy of the turn-on signal and establish a speech circuit thereof.

2. A method as claimed in claim 1, wherein the step (l) comprises switching the cordless station from the assigned speech channel to the control channel for a prescribed period of time if said received copy of the turn-on signal does not contain the identifier of the station and periodically turning off supplies to power draining units thereof following the end of said prescribed period.

3. A method as claimed in claim 2, wherein the step (j) comprises receiving said copy of the off-hook signal from one of the selected access units and transmitting a proceed-to-clear signal from said main controller to the other selected access units, wherein the step (k) comprises the steps of receiving said proceed-to-clear signal and, in response thereto, broadcasting clearing signals respectively identifying the cordless stations not going off hook, and wherein the step (l) comprises receiving the clearing signal, and in response thereto, switching the station from the assigned speech channel to the control channel for a prescribed period of time and periodically turning off power supplies to power draining units thereof following the end of said prescribed period.

4. A cordless key telephone system for covering a plurality of service areas in which cordless stations are located, comprising:

a plurality of access units divided into groups corresponding respectively to said service areas, the access units of each group being located in the corresponding service area for broadcasting signals on a two-way control channel or on an assigned two-way speech channel;

a main controller coupled to a switched telephone network for selecting one of the access units for each of said service areas in response to an incoming call from said network and transmitting a first alert signal to the selected access units;

each of said access units being responsive to said first alert signal for broadcasting over the control channel a recurrent sequence of second alert signals respectively identifying standby cordless stations, responsive to receipt of an acknowledgement signal from the cordless stations for transmitting a copy of the acknowledgement signal to said main controller, responsive to receipt of a proceed-to-assign signal from said main controller for broadcasting over the control channel a channel assignment signal identifying an assigned speech channel, responsive to receipt of an end-of-switching signal from the cordless stations for sequentially broadcasting over the assigned speech channel ringing signals respectively identifying the cordless stations which returned said acknowledgement signals, responsive to an off-hook signal from a replying cordless station for transmitting a copy of the off-hook signal to said main controller, and responsive to receipt of a turn-on signal from said main controller identifying the replying cordless station for broadcasting over the assigned speech channel a copy of said turn-on signal, said main controller transmitting said proceed-to-assign signal if the number of the copies of the acknowledgement signals from said selected access units is equal to the number of all standby cordless stations, and transmitting said turn-on signal to one of the selected access units if said copy of the off-hook signal is received therefrom, and each of said cordless stations responsive to the second alert signal identifying the cordless station for transmitting over the control channel said acknowledgement signal, responsive to the channel assignment signal for transmitting over the assigned speech channel said end-of-switching signal, transmitting over the assigned speech channel said off-hook signal when the cordless station goes off hook in response to the ringing signal identifying the cordless station, and establishing a speech circuit in response to the copy of said turn-on signal identifying the cordless station.

5. A cordless key telephone system as claimed in claim 4 wherein each of said cordless stations comprises means for switching the cordless station from the assigned speech channel to the control channel for a prescribed period of time in response to receipt of said broadcast copy of the turn-on signal not identifying the cordless station and periodically turning off power supplies to power draining units thereof following the end of said prescribed period.

6. A cordless key telephone system as claimed in claim 5, wherein said main controller comprises means responsive to said copy of the off-hook signal from said one of the selected access units for transmitting a proceed-to-clear signal to the other selected access units, wherein each of said access units comprises means responsive to said proceed-to-clear signal for broadcasting clearing signals respectively identifying the cordless stations not going off hook, and wherein each of the cordless stations comprises means responsive to the clearing signal identifying the cordless station for switching the cordless station from the assigned speech channel to the control channel for a prescribed period of time and periodically turning off power supplies to power draining units thereof following the end of said prescribed period.

* * * * *